United States Patent [19]

Kuroki

[11] Patent Number: 5,335,751
[45] Date of Patent: Aug. 9, 1994

[54] CONSOLE BOX FOR AN AUTOMOBILE
[75] Inventor: Kenji Kuroki, Hamamatsu, Japan
[73] Assignee: Suzuki Motor Corporation, Tokyo, Japan
[21] Appl. No.: 60,447
[22] Filed: May 12, 1993
[30] Foreign Application Priority Data May 26, 1992 [JP] Japan .................................. 132993

[51] Int. Cl.$^5$ .............................................. B60K 23/00
[52] U.S. Cl. ........................................ 180/336; 180/84; 180/315; 277/212 FB; 403/223; 403/233
[58] Field of Search ................. 180/336, 335, 315, 84; 403/223, 233, 240, 247; 277/212 FB

[56] References Cited

U.S. PATENT DOCUMENTS

| 3,926,068 | 12/1975 | Jantzen et al. | 180/89.14 |
| 4,116,115 | 9/1978 | Gross et al. | 277/212 FB |
| 4,237,998 | 12/1980 | Matayoshi | 180/89.14 |
| 4,991,457 | 2/1991 | Chen | 277/212 FB |

FOREIGN PATENT DOCUMENTS

| 2395856 | 3/1979 | France | 180/336 |
| 2102103 | 1/1983 | United Kingdom | 180/335 |

Primary Examiner—Eric Culbreth
Attorney, Agent, or Firm—Arnold, White & Durkee

[57] ABSTRACT

A console box for automobile includes a bracket for fixing a boot which is fastened to the peripheral edge of shift lever opening of a console box body and a shift lever boot which is installed over the bracket, in which the bracket is provided with a pair of flanges disposed with a vertical distance therebetween, a tightening portion is disposed near the inner edge of said flanges, and a receiving portion for receiving said shift lever boot is defined over the tightening portion, by which the peripheral edge of shift lever opening of the console box body is clasped between the pair of flanges.

4 Claims, 4 Drawing Sheets

CONSOLE BOX FOR AN AUTOMOBILE

FIELD OF THE INVENTION AND RELATED ART STATEMENT

The present invention relates to a console box for an automobile.

A conventional console box for an automobile comprises a console box body 52 having a shift lever opening 51. On the under surface of the peripheral portion of the shift lever opening 51, a plurality of bosses 53 are disposed. A bracket 54 for fixing a boot is fastened at the lower periphery thereof to these bosses 53 with screws 55, and the lower part of a shift lever boot 56 is fitted to the upper periphery of the bracket 54.

In the conventional console box described above, a depression is formed on the surface of the molded console box body 52 because the bosses 53, which serve as fastening means for bracket 54, are arranged on the under surface of the peripheral portion of the shift lever opening 51. Since the depression is visible from the outside, the presence of depression impairs the appearance of the console box on the floor.

OBJECT AND SUMMARY OF THE INVENTION

Accordingly, an object of the present invention is to provide a console box for an automobile which can improve the appearance without an increase in cost.

To achieve the above object, a console box for an automobile in accordance with the present invention comprises a bracket for fixing a boot which is fastened to the peripheral edge of shift lever opening of a console box body and a shift lever boot which is installed over the bracket, in which the bracket is provided with a pair of flanges disposed with a vertical distance therebetween, a tightening portion is disposed at the inner edges of said flanges, and a receiving portion for receiving said shift lever boot is defined over the tightening portion, by which the peripheral edge of shift lever opening of the console box body is clasped between the pair of flanges.

In the console box for an automobile in accordance with the present invention, a pair of flanges are formed with a vertical distance therebetween, a tightening portion is disposed near the inner edges of said flanges, and a receiving portion for receiving the shift lever boot is defined over the tightening portion. Since the peripheral edge of shift lever opening of the console box body is clasped between the pair of flanges, the bracket can be securely installed to the console box body. Also, the upper part of the tightening portion is not seen because it is covered with the shift lever boot installed over the bracket.

As described above, a console box for an automobile in accordance with the present invention comprises a bracket for fixing a boot which is fastened to the peripheral edge of shift lever opening of a console box body and a shift lever boot which is installed over the bracket, in which the bracket is provided with a pair of flanges disposed with a vertical distance therebetween, a tightening portion is disposed near the inner edges of said flanges, and a receiving portion for receiving said shift lever boot is defined over the tightening portion, by which the peripheral edge of shift lever opening of the console box body is clasped between the pair of flanges. Therefore, the bracket can be easily and securely installed to the console box body without an increase in parts cost. Also, in the console box of the present invention, even if a depression is produced on the top surface of the bracket due to the tightening portion, the depression is not seen from the outside, thereby improving the appearance, because the upper part of the tightening portion is covered with the shift lever boot installed over the bracket.

DETAILED DESCRIPTION OF PREFERRED EMBODIMENTS

Figure 1:
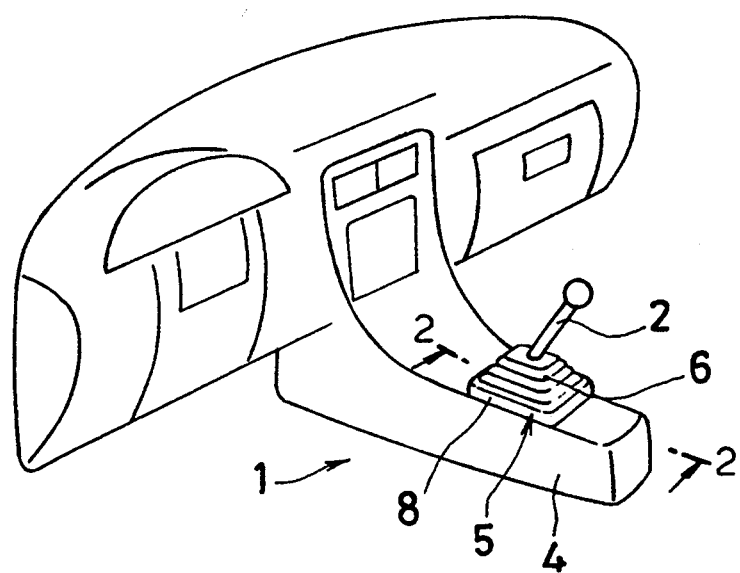
FIG. 1 is a perspective of the console box for an automobile with reference to a preferred embodiment of the present invention.

One embodiment of the present invention shown in the drawings will be described in detail below.

FIGS. 1 through 8 show one embodiment of a console box for an automobile in accordance with the present invention. In the figures, a console box 1 is provided with a shift lever 2 or the like and disposed between the right and left front seats (not shown).

The console box 1 comprises a console box body 4 having a shift lever opening 3 on the top surface thereof. The lower part of the shift lever 2 is inserted through the opening 3. A shift lever boot 6 is installed to the console box body 4 via a bracket 5 for fixing the boot, the bracket 5 being made of resin. The lower part of the shift lever 2 and the shift lever opening 3 are covered with this boot 6. The boot 6 is formed in a four-sided pyramid shape such that its cross-sectional area increases from top to bottom, and has a shape of bellows at the intermediate portion to provide resilience. At the lower end of the boot, a fitting portion 6a is formed by an inward right angle bend.

The shift lever opening 3 is nearly rectangular in a plane, and the peripheral edge 3a thereof is bent substantially at a right angle downwardly. Therefore, the lower end of the peripheral edge 3a is disposed at a position lower by a predetermined distance than the top surface of the console box body 4.

The bracket 5 is formed integrally in a rectangular shape in one plane with an opening at the center, the size of the periphery being larger than the shift lever opening 3. At the upper outer periphery of the bracket 5, a channel-shaped circumferential groove 7 is defined to fit the fitting portion 6a of the boot 6, thus the circumferential groove 7 constituting a receiving portion of the boot 6.

An upper flange 8 extending outward is formed at the upper outer periphery of bracket 5 at the position under the circumferential groove 7. The tip of the upper flange 8 is slightly bent downward. Also, the upper flange 8 has a length such that the tip thereof is in contact with the top surface of the console box body 4 when the bracket 5 is installed to the console box body 4.

At the lower inner periphery of the bracket 5, four lower flanges 9 extending inward are formed at certain intervals. In molding the bracket 5, the lower flanges 9 are arranged substantially in such a manner that they are opposed to each other longitudinally and transversely. Near the inner edge of the lower flange 9, a thin-wall hinge 10 having a notch of V-shaped cross section is disposed so that the lower flange 9 is turned down at the thin-wall hinge 10 and lapped on a later-described boss when the bracket 5 is installed. Therefore, the upper flange 8 and the lower flanges 9 are arranged in an opposed manner with a certain distance vertically therebetween.

At the base side of the upper and lower flanges 8 and 9 of the bracket 5, a boss 11 extending vertically is disposed. The boss 11 constitutes a tightening portion for a screw 12. Therefore, a screw hole 13 is defined in the boss 11 to accommodate the screw 12. The screw hole 13 is open at the lower end only to insert the screw 12 from under the bracket 5. In the lower flange 9, an insertion hole 14 is formed to insert the screw 12. The insertion hole 14 is positioned so as to coincide with the opening of the screw hole 13 when the lower flange 9 is turned down and lapped on the boss 11.

Thus, the circumferential groove 7, which is a receiving portion of the boot 6, is disposed over the boss 11. Therefore, the top surface of the bracket 5 at the position corresponding to the boss 11 is covered with the boot 6. As a result, even if a depression is produced on the top surface of the bracket 5 by the boss 11, the depression is not seen from the outside.

To install the shift lever boot 6 to the console box 1 using the bracket 5 for fixing the boot in accordance with the embodiment of the present invention, the lower flanges 9 of the bracket 5 of a shape shown in FIGS. 3 through 8 are turned down at the thin-wall hinge 10 and lapped on the boss 11. First, the bracket 5 is positioned in the opening 3 for the shift lever in the console box body 4. The peripheral edge 3a of the opening in the console box body 4 is inserted between the upper and lower flanges 8 and 9 so that the tip of the upper flange 8 is brought into contact with the top surface of the console box body 4, and the lower end of the peripheral edge 3a of the opening is brought into contact with the top surface of the lower flange 9.

Figure 2:
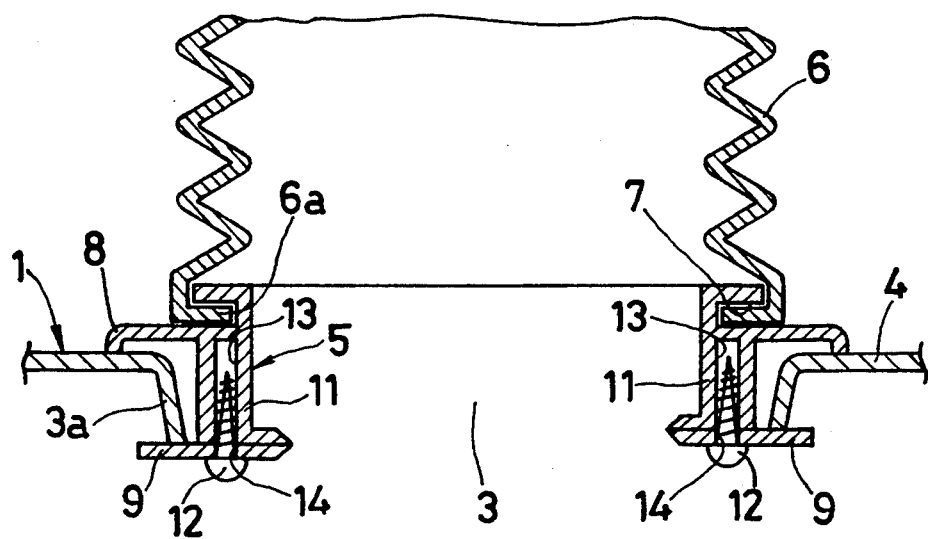
FIG. 2 is a cross section of the same at line 2—2 of FIG. 1, omitting part thereof.
Figure 3:
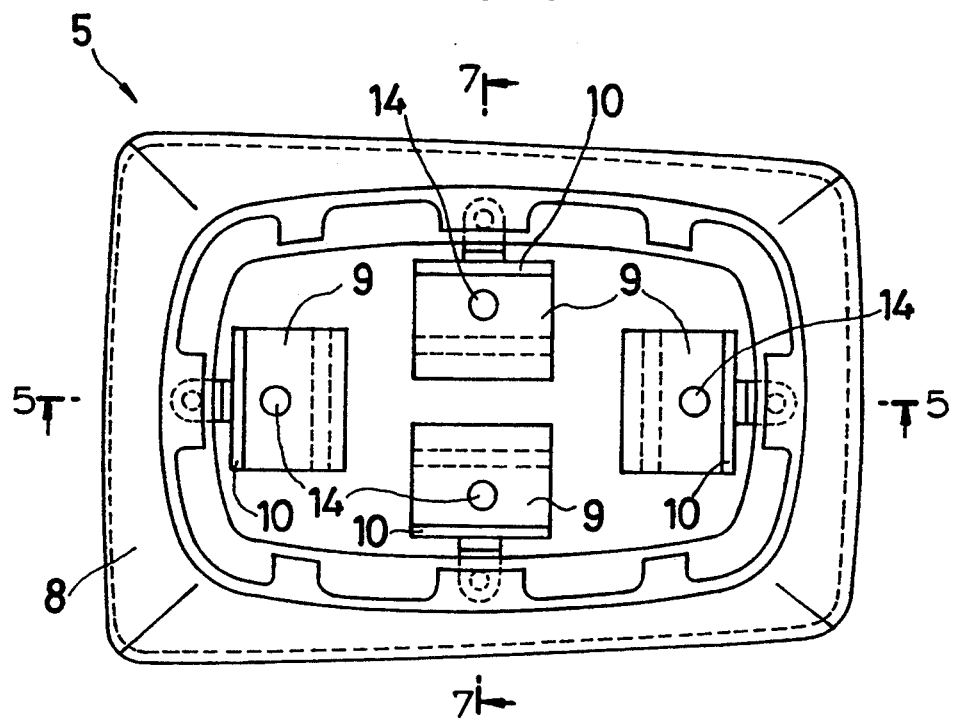
FIG. 3 is a plan view of a bracket for fixing a boot to be fastened to the main body of the console box.
Figure 4:
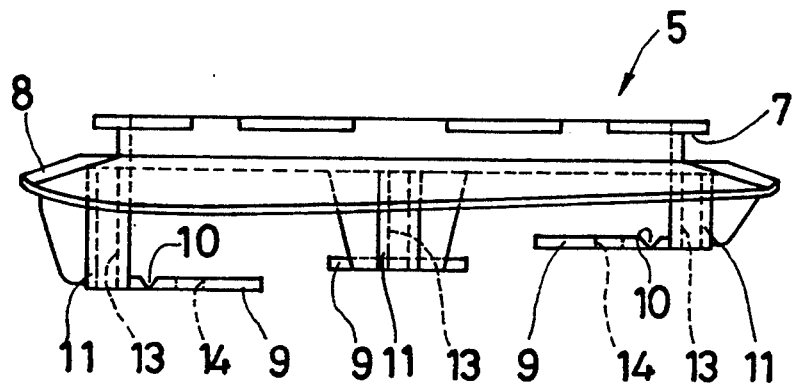
FIG. 4 is a front view of said bracket.
Figure 5:
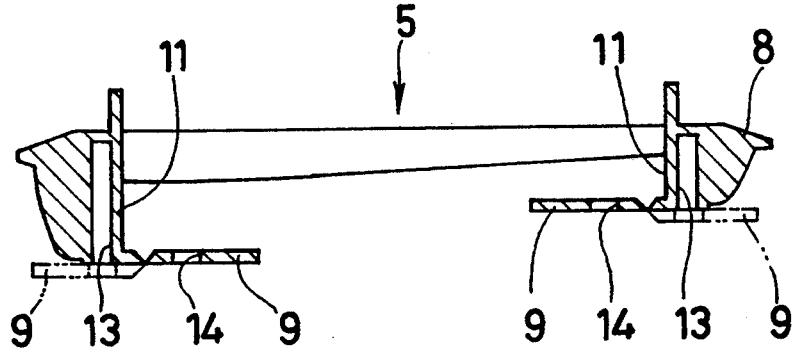
FIG. 5 is a cross section of the same at line 5—5 of FIG. 3, omitting part thereof.
Figure 6:
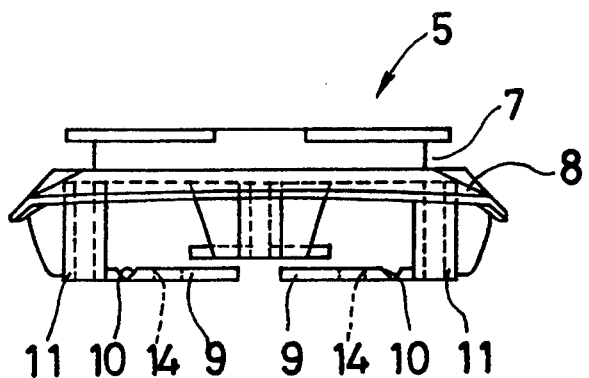
FIG. 6 is a side view of said bracket.
Figure 7:
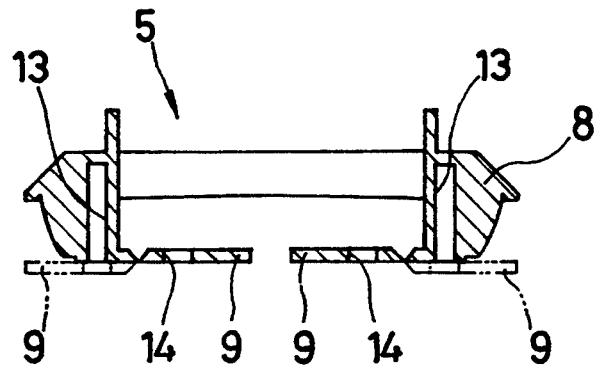
FIG. 7 is a cross section of the same at line 7—7 of FIG. 3, omitting part thereof.
Figure 8:
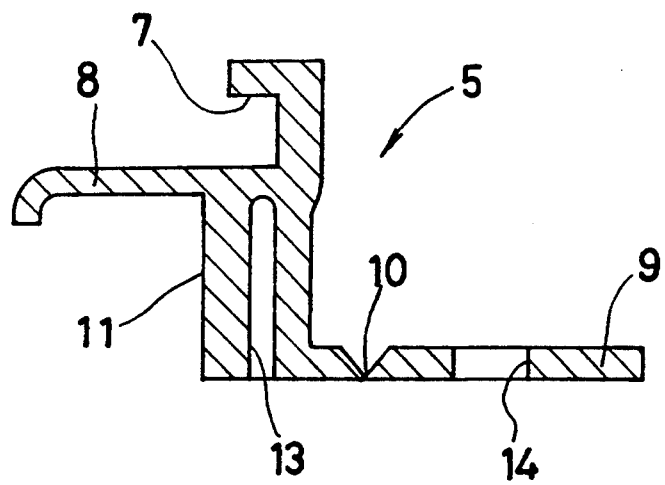
FIG. 8 is a cross section of said bracket showing its upper and lower flanges on an enlarged scale.
Figure 9:
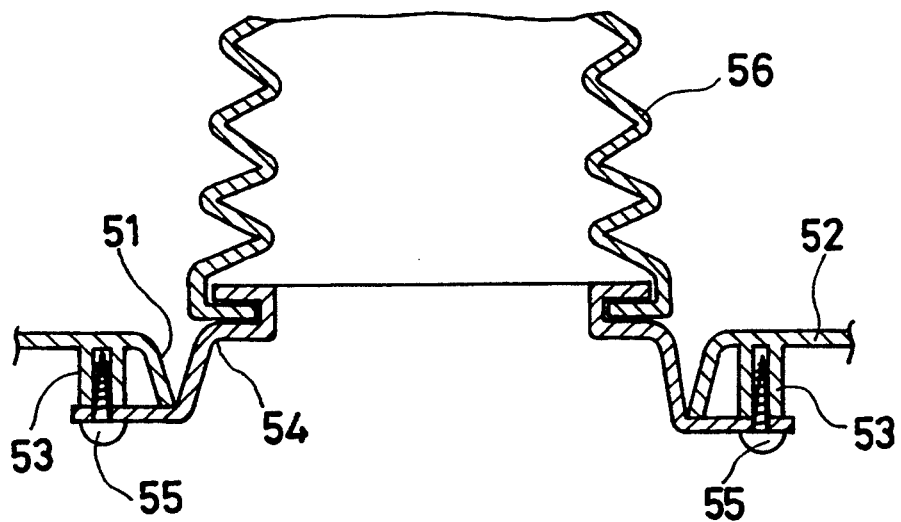
FIG. 9 is a cross section of a conventional console box for an automobile illustrated corresponding to FIG. 2 of the present invention.

In this condition, each screw 12 is screwed into the screw hole 13 in the boss 11 via the insertion hole 14, by which the bracket 5 is fixed with the peripheral edge 3a of the opening being clasped between the upper and lower flanges 8 and 9 (see FIG. 2). Then, the fitting portion 6a of the boot 6 is fitted into the circumferential groove 7 of the bracket 5, thus the boot 6 being installed to the console box via the bracket 5. The shift lever 2 may be installed either before or after the bracket is fastened to the console box body 4.

In the console box 1 of this embodiment, the bracket 5 is fixed with the peripheral edge 3a of the shift lever opening 3 being clasped between the upper and lower flanges 8 and 9 by tightening the screw 12 into the boss 11 via the insertion hole 14 and screw hole 13. Therefore, the bracket 5 can be securely installed to the console box body 4. Moreover, since the thin-wall hinge 10 is disposed on the lower flange 9, the attaching portion for the console box body 4 can be easily obtained by turning down the lower flange 9 using the thin-wall hinge 10, so that the installation function is improved at a cost similar to that of the conventional construction. Over the boss 11 of the bracket 5, the circumferential groove 7 is installed to fit the fitting portion of the shift lever boot 6, so that a depression, if produced on the top surface of the bracket 5, can be invisible.

Although the invention has been described in its preferred form with a certain degree of particularity, it is understood that the invention is not limited to the above-described embodiment, and that various changes and modifications may be made without departing from the spirit and scope of the invention. For example, the shape of the bracket 5 for fixing the boot is not limited to that shown in the drawings, and can be appropriately selected in accordance of the type of vehicle to which the bracket is applied.

We claim:

1. A console box for an automobile having a boot-securing bracket which is fastened to the peripheral edge of a shift lever opening formed in the console box body and a shift lever boot which is installed over said bracket, said console box comprising:

a pair of vertically spaced flanges formed on said bracket, said bracket further including a tightening portion, said tightening portion supporting said flanges and maintaining said flanges in vertically spaced positions with respect to one another, a receiving portion for said shift lever boot being positioned on said tightening portion, the lower flange of said pair of flanges being connected to said tightening portion by a hinge, said lower flange being folded at said hinge around said tightening portion such that said upper and lower flanges are arranged in vertically spaced juxtaposition, said lower flange being fastened to said tightening portion at a point spaced form the location of said hinge, said peripheral edge of said opening for said shift lever formed in said console box body being clamped between said flanges.

2. The console box for an automobile, as set forth in claim 1, wherein said folded lower flange is secured to said tightening portion by a screw.

3. The console box for an automobile as set forth in claim 1, wherein said upper flange includes a free end, said free end being curved downwardly and said lower flange extending substantially horizontally.

4. The console box for an automobile as set forth in claim 1, wherein said lower flange includes a first pair of pieces arranged in spaced opposition across said shift lever opening and a second pair of pieces arranged transversely in spaced opposition across said shift lever opening such that said peripheral edge of said opening may be clamped by said lower flange at four locations about said opening.

* * * * *